United States Patent [19]

Watt

[11] Patent Number: 5,519,854

[45] Date of Patent: May 21, 1996

[54] WRITE REQUEST INTERLOCK

[75] Inventor: Simon C. Watt, Cambridge, United Kingdom

[73] Assignee: Advanced RISC Machines Limited, Cambridge, United Kingdom

[21] Appl. No.: 303,325

[22] Filed: Sep. 9, 1994

[51] Int. Cl.$^6$ ................................ G06F 7/00; G06F 1/12
[52] U.S. Cl. ................................ 395/550; 364/DIG. 2; 364/934.2; 364/934.71; 364/926.5; 364/939.3
[58] Field of Search ............................. 395/550; 326/96; 365/189.05

[56] References Cited

U.S. PATENT DOCUMENTS 5,124,589  6/1992  Shiomi et al. .................. 326/96 X
5,278,789  1/1994  Inoue et al. .................. 365/189.05 X

*Primary Examiner*—Thomas M. Heckler
*Attorney, Agent, or Firm*—Albert C. Smith

[57] ABSTRACT

A CPU core 4 can operate at either an internal clock frequency fclk or an external clock frequency mclk. When operating at the internal clock frequency fclk, write request signals are buffered in a write buffer 10. When operating at the external clock frequency mclk, write request signals are unbuffered. In order to avoid write request signals reaching a signal bus 6 out of order, an interlock is provided between the two paths so that any pending write request signals in the write buffer 10 will serve to hold off any write request signals that may issue through the other path. When a write request signal generated at the external clock frequency is blocked, this serves to stall the CPU core 4 since the blocked external clock write request signal may give rise to an externally generated abort which would alter subsequent processing.

10 Claims, 2 Drawing Sheets

WRITE REQUEST INTERLOCK

BACKGROUND OF THE INVENTION

1. Field of the Invention

This invention relates to the field of data processing. More particularly, this invention relates to data processing systems having asynchronous internal and external clocks.

2. Description of the Prior Art

It is known to provide microprocessors that use an internal clock with a high frequency for on-chip operations and an external clock with a lower frequency for off-chip operations. In this way, on-chip operations, such as arithmetic operations and cache accesses, can proceed at a higher speed than off-chip operations for which the use of relatively large external buses places a limiting factor upon the external clock speed.

One mechanism for improving the data processing performance of such systems is to provide a write buffer. The write buffer is used to store pending off-chip write requests (e.g. write accesses involving both a write address and write data) whilst maintaining the high speed operation at the internal clock frequency. The data in the write buffer is then written out to the main memory at a slower memory clock rate independently of the processor core. The processor core and write buffer effectively operate in parallel.

An important consideration in such operation is that the change between the internal clock frequency and the external clock frequency should be synchronised to avoid problems occurring, such as meta-stability which could otherwise occur if a request occurred right on a transition of the external clock. Synchronisation mechanism are provided to allow this meta-stability to settle before a write request at the external clock is generated.

In order to preserve the integrity of such data processing systems, it is important that write requests are serviced in the same order that they are issued, irrespective of whether they are buffered or unbuffered.

Another factor influencing such systems is the trend towards increasing clock frequencies. Advances in the design and fabrication technology of integrated circuit microprocessors have led to a steady increase in attainable clock frequencies. Whilst this allows more processing operations to be performed in a given time, it tends to give rise to problems in other areas, such as the time taken for accesses to external peripherals (e.g. memory) which have not advanced in clock speed so rapidly.

SUMMARY OF THE INVENTION

An object of the invention is to address the abovementioned problems.

Viewed from one aspect, this invention provides apparatus for processing data, said apparatus being selectably operable at one of an internal clock frequency and an external clock frequency, said internal clock frequency being asynchronous with said external clock frequency, said apparatus comprising:

(i) means for generating write request signals, said write request signals comprising internal clock write request signals at said internal clock frequency and external clock write request signals said external clock frequency;

(ii) an internal clock write request signal buffer for buffering one or more internal clock write request signals to be written from said internal clock write request buffer at said external clock frequency;

(iii) a synchroniser operable following generation of a internal clock write request signal to impose a minimum delay between receipt of said internal clock write request signal by said internal clock write request signal buffer and writing of said internal clock write request signal from said internal clock write request signal buffer at said external clock frequency;

(iv) a signal bus for passing said external clock write request signals from said means for generating to an external receiver operating at said external frequency and for passing said internal clock write request signals from said internal clock write request signal buffer to said external receiver operating at said external clock frequency after said synchroniser has imposed said minimum delay; and (v) means for inhibiting passing of any external clock write request signals via said signal bus whilst said internal clock write request signal buffer is buffering any internal clock write request signals.

The invention both recognises and solves the problem of a write request generated from the external clock being directly committed to the signal bus whilst a write request generated earlier from the internal clock is still buffered pending the synchronisation and change from the internal clock to the external clock being effected and sensed as complete. At one level this problem might result in the two write requests simultaneously trying to seek access to the bus causing both to fail. Potentially more seriously, a situation could arise in which the unbuffered write request is actioned out of sequence relative to the buffered write requests causing a breakdown in the system integrity.

Having recognised this problem, the invention provides a solution by incorporating a mechanism that inhibits external clock write requests being passed out to an external receiver whilst there are any internal clock write requests pending in the internal clock write request signal buffer that have not yet been synchronised to the external clock.

In order to reduce the impact of the means for inhibiting upon system performance it is preferred to provide an external clock write request signal buffer for buffering an external clock write request signal whilst said means for inhibiting inhibits passing of any external clock write request signals.

This prevents loss of any external write request signals without unduly impacting the system performance.

Such an external clock write request signal buffer provides the capability for allowing the means for generating to freely continue its operation up to and including the generation of an external clock write request signal following a sequence of buffered pending internal clock write request signals.

In order to complement the provision of the external clock write request signal buffer, said means for inhibiting controls said means for generating to stall generation of more than one external clock write request signal whilst said internal clock write request signal buffer is buffering any internal clock write request signals.

A particularly efficient and convenient manner in which to embody the first write request buffer is as a first-in-first-out memory.

The means for inhibiting could take many forms. A particularly simple and efficient form is one in which said means for inhibiting comprises a latch, said latch being set by loading of a internal clock write request signal into said internal clock write request signal buffer and reset by reading of an internal clock write request signal from said internal clock write request signal buffer.

As previously mentioned, the internal clock write request signals are buffered whereas the external clock write request signals are substantially unbuffered. A particular circumstance which leads to a requirement for such a characteristic, and in which the invention is particularly advantageous, is one in which said external clock write request signals include write request signal that may trigger externally generated abort signals to be generated in said external receiver.

It will be appreciated that the invention is applicable to a wide range of situations in which the internal clock frequency is asynchronous with the external clock frequency. However, the invention is particularly suited to situations where said internal clock frequency is higher than said external clock frequency.

Whilst the invention may be embodied in many forms and (e.g. applications specific integrated circuits, circuits composed of discrete components) the invention is particularly suited to embodiments in which the means for generating comprises a central processing unit cope and the apparatus is embodied as an integrated circuit.

Viewed from another aspect, this invention provides a method of processing data, said processing being selectably operable at one of an internal clock frequency and an external clock frequency, said internal clock frequency being asynchronous with said external clock frequency, said method comprising the steps of:

(i) generating write request signals, said write request signals comprising internal clock write request signals at said internal clock frequency and external clock write request signals said external clock frequency;

(ii) buffering one or more internal clock write request signals to be written from said internal clock write request buffer at said external clock frequency;

(iii) following generation of a internal clock write request signal imposing a minimum delay between receipt of said internal clock write request signal by said internal clock write request signal buffer and writing of said internal clock write request signal from said internal clock write request signal buffer at said external clock frequency;

(iv) passing said external clock write request signals directly to an external receiver operating at said external frequency;

(v) passing buffered internal clock write request signals to said external receiver operating at said external clock frequency after said change; and (vi) inhibiting passing of any external clock write request signals whilst any internal clock write request signals are buffered.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
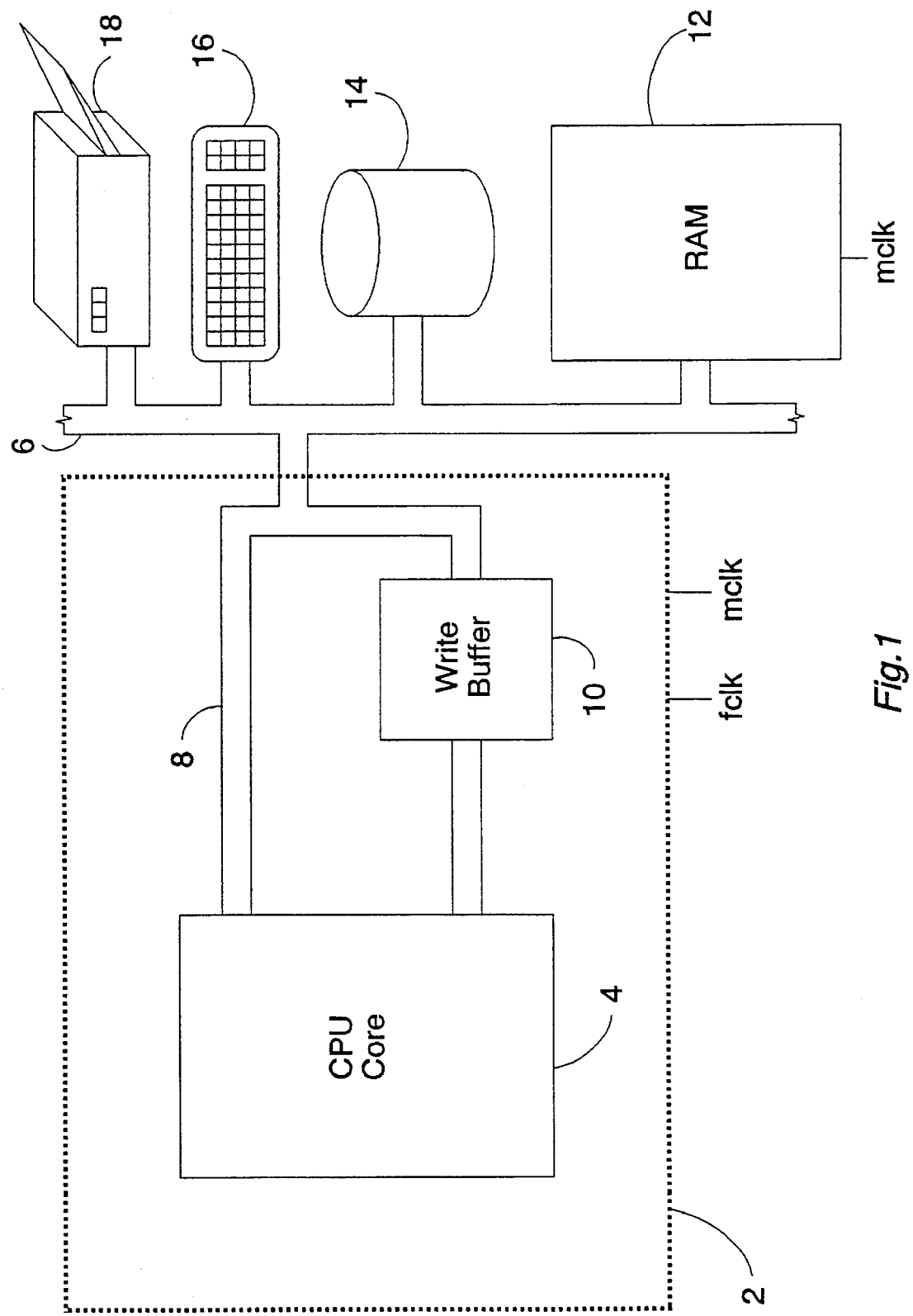
FIG. 1 schematically illustrates a microprocessor connected via a signal bus to various external devices.

FIG. 1 schematically illustrates an integrated circuit 2 having a central processor unit (CPU) core 4. The CPU core 4 generates write request signals that are passed to a signal bus 6 either directly over path 8 or indirectly via a write buffer 10.

A number of different external receivers are coupled to the signal bus 6 to receive the write request signals. These external receivers include a random access memory (RAM) 12, a hard disc file 14, a keyboard 16 and a printer 18.

The CPU core of the integrated circuit 2 can be driven by either an internal clock signal fclk or an external clock signal mclk. The internal clock signal fclk has a higher frequency than the external clock signal mclk. The internal clock frequency fclk is used for on-chip operation, whereas the external clock mclk is used when off-chip communication is required and for all external operations.

In use, internal clock write request signals that do not need to be synchronously effected (i.e. do not have the ability to give rise to externally generated aborts) are generated at the internal clock frequency fclk by the CPU core 4 and sent to the write buffer 10. As soon as possible, a change is made to the external clock frequency mclk domain and the buffered internal clock write request signals in the write buffer 10 are read out to the external receiver, such as the RAM 12 via the signal bus 6. The RAM 12 is driven by signals referenced to the external clock mclk.

In contrast to the above, in the case where a write request signal must be performed synchronously (e.g the write request signal can give rise to an externally generated abort), most importantly, the integrated circuit 2 first changes to the external clock frequency mclk. The external clock write request signal is then issued directly via the path 8 to the signal bus 6 from which it can pass to a synchronous device, such as the printer 18.

Figure 2:
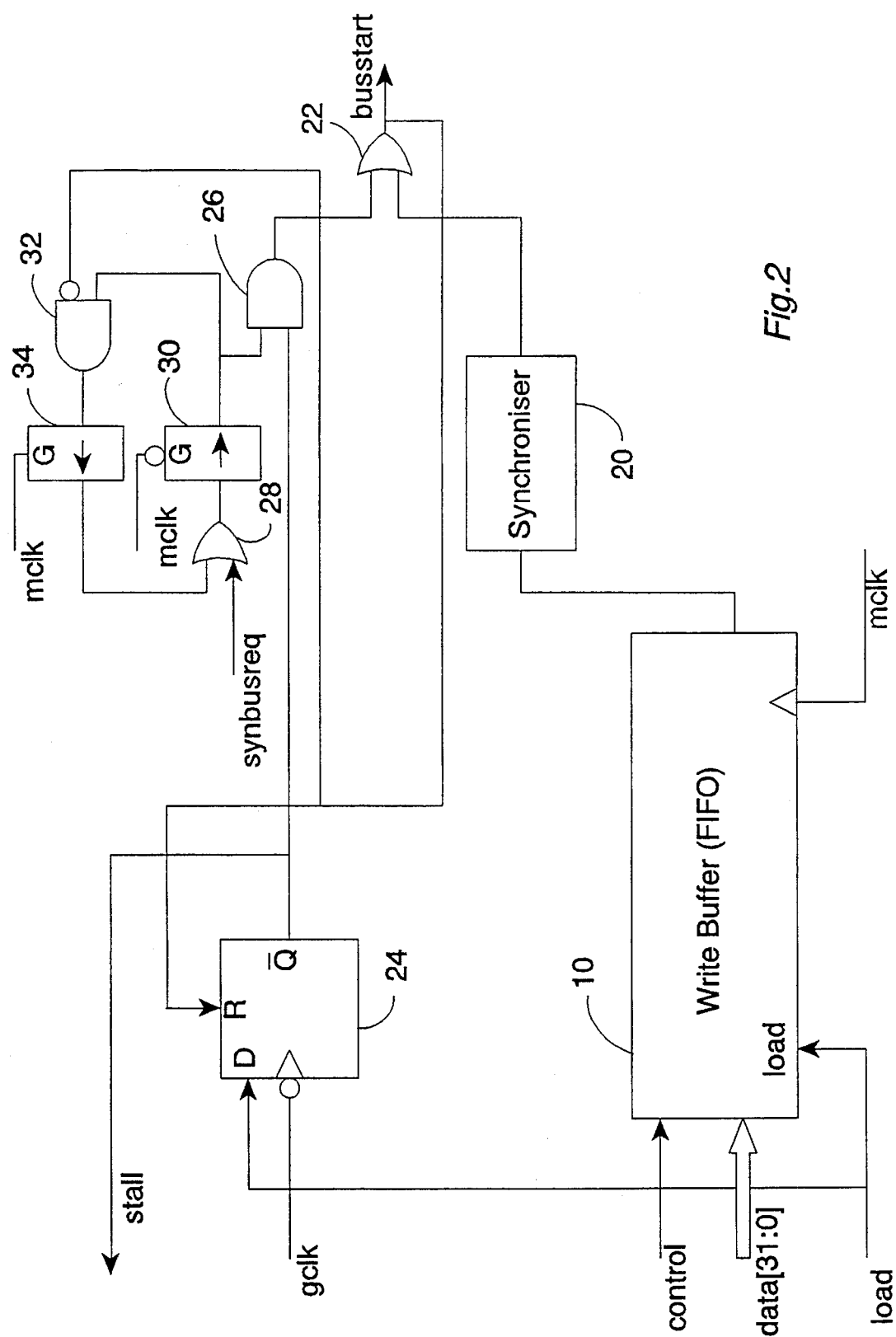
FIG. 2 illustrates a circuit for controlling the interlock between write signals following different paths to the signal bus.

FIG. 2 illustrates a circuit for coordinating the successive action of internal clock write request signals and external clock write request signals. Internal clock write request signals are written into the write buffer 10 (a first-in-first-out memory) under the control of a load signal. The load signal is valid on the falling edge of a composite clock signal gclk that also sets a latch 24. The internal clock write request signals comprise thirty two bits of data "data[31:0]" and associate control bits.

There is an associated FIFO (not illustrated) which stores the address of the write operation. This contains fewer entries than the data FIFO 10 as a single write operation can write multiple items of data to consecutive locations. It is loaded in a similar manner to the data FIFO 10 and is advanced by a derivative of a busstart signal.

A synchroniser 20 responds to the presence of pending buffered internal clock write request signals in the write buffer 10 to synchronise a change from the internal clock fclk using which those requests arrived in the write buffer 10 to the external clock mclk using which those signals must be read from the write buffer 10. The synchroniser 20 imposes a minimum delay upon the change to avoid problems due to meta-stability resulting from a request arrive just as the external clock mclk is at the point a which data may be read from the write buffer 10. When the minimum delay has passes and an appropriate clock edge occurs in the external clock 10, the buffered pending internal clock write request signals are read from the write buffer 10 under the action of the external clock mclk and a busstart signal initiating a bus transfer that is issued from the synchroniser 20 via an OR gate 22. All requests issued via the write buffer (FIFO) 10 pass through the synchroniser 20. The function of the synchroniser 20 is to reliably change between two timing domains and many possible circuit will achieve this.

The load signal is also used to set the latch 24. The latch 24 is clocked by the composite clock signal gclk that formed of whichever one of the internal clock signal fclk or the external clock signal mclk is currently selected. The inverted output of the latch 24 gives rise to a stall signal that is fed back to the CPU cope 4, where it ensures that the CPU will stall and wait fop the external clock write request to be serviced before continuing operation. The stall signal also passes to an AND gate 26 where it serves to block the passage of an external clock Write request signal to the bus via the OR gate 22.

External clock write request signals (synbusreq) are input to an OR gate 28 from which they are stored within a latch 30. The output of the latch 30 passes via the AND gate 26 to the OR gate 20. The signal stored in the latch 30 is recirculated via an AND gate 32, another latch 34 and the OR gate 28 back to the latch 30. The latch 30 and the latch 34 effectively form an external clock write request signal buffer.

In operation, when the stall signal is low, the AND gate 26 blocks the external clock write request signal from reaching the signal bus 6, whilst the latches 30 and 34 serve to recirculate the external clock write request signal until the stall signal is removed.

The stall signal is removed by the resetting of the latch 24. The latch 24 is reset by every new bus cycle. The dangerous cases which this invention addresses is the case where an internal clock request has been issued, but not yet synchronised to the external clock. Once this synchronisation has occurred, control logic elsewhere can ensure the writes are handled in the correct order.

The latch 24 is reset by the busstart signal indicating a new bus cycle has started. The latch 34 is reset by the same signal gated with a signal indicating that the access that has just started is unbuffered (i.e. in response to a request held in the latches 28, 34).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus being selectably operable at one of an internal clock frequency and an external clock frequency, said internal clock frequency being asynchronous with said external clock frequency, said apparatus comprising:

(i) means for generating write request signals, said write request signals comprising internal clock write request signals at said internal clock frequency and external clock write request signals at said external clock frequency;

(ii) an internal clock write request signal buffer for buffering one or more internal clock write request signals to be written from said internal clock write request buffer at said external clock frequency;

(iii) a synchroniser operable following generation of an internal clock write request signal to impose a minimum delay between receipt of said internal clock write request signal by said internal clock write request signal buffer and writing of said internal clock write request signal from said internal clock write request signal buffer at said external clock frequency;

(iv) a signal bus for passing said external clock write request signals from said means for generating to an external receiver operating at said external frequency and for passing said internal clock write request signals from said internal clock write request signal buffer to said external receiver operating at said external clock frequency after said synchroniser has imposed said minimum delay; and (v) means for inhibiting passing of any external clock write request signals via said signal bus while said internal clock write request signal buffer is buffering any internal clock write request signals.

2. Apparatus as claimed in claim 1, comprising an external clock write request signal buffer for buffering an external clock write request signal while said means for inhibiting inhibits passing of any external clock write request signals.

3. Apparatus as claimed in claim 2, wherein said means for inhibiting controls said means for generating to stall generation of more than one external clock write request signal while said internal clock write request signal buffer is buffering any internal clock write request signals.

4. Apparatus as claimed in claim 1, wherein said internal clock write request signal buffer comprises a first-in-first-out memory.

5. Apparatus as claimed in claim 1, wherein said means for inhibiting comprises a latch, said latch being set by loading of an internal clock write request signal into said internal clock write request signal buffer and reset by reading of a last internal clock write request signal from said internal clock write request signal buffer.

6. Apparatus as claimed in claim 1, wherein said external clock write request signals include at write request signal that may trigger externally generated abort signals to be generated in said external receiver.

7. Apparatus as claimed in claim 1, wherein said internal clock frequency is higher than said external clock frequency.

8. Apparatus as claimed in claim 1, wherein said means for generating comprises a central processing unit core.

9. Apparatus as claimed in claim 1, wherein said apparatus comprises an integrated circuit.

10. A method of processing data, said processing being selectably operable at one of an internal clock frequency and an external clock frequency, said internal clock frequency being asynchronous with said external clock frequency, said method comprising the steps of:

(i) generating write request signals, said write request signals comprising internal clock write request signals at said internal clock frequency and external clock write request signals, said external clock frequency;

(ii) buffering one or more internal clock write request signals to be written from an internal clock write request buffer at said external clock frequency;

(iii) following generation of an internal clock write request signal, imposing a minimum delay between receipt of said internal clock write request signal by said internal clock write request signal buffer and writing of said internal clock write request signal from said internal clock write request signal buffer at said external clock frequency;

(iv) passing said external clock write request signals directly to an external receiver operating at said external frequency;

(v) passing buffered internal clock write request signals to said external receiver operating at said external clock frequency after said minimum delay has been imposed; and (vi) inhibiting passing of any external clock write request signals while any internal clock write request signals are buffered.

* * * * *